(12) United States Patent
Lah (10) Patent No.: US 10,114,155 B2
(45) Date of Patent: Oct. 30, 2018

(54) OPTICAL FILTER AND IMAGING DEVICE COMPRISING SAME

(71) Applicant: Woo Joo Lah, Gyeonggi-do (KR)

(72) Inventor: Woo Joo Lah, Gyeonggi-do (KR)

( * ) Notice: Subject to any disclaimer, the term of this patent is extended or adjusted under 35 U.S.C. 154(b) by 151 days.

(21) Appl. No.: 15/118,112

(22) PCT Filed: Oct. 31, 2014

(86) PCT No.: PCT/KR2014/010336
§ 371 (c)(1),
(2) Date: Feb. 13, 2017

(87) PCT Pub. No.: WO2015/122595
PCT Pub. Date: Aug. 20, 2015

(65) Prior Publication Data
US 2017/0146708 A1 May 25, 2017

(30) Foreign Application Priority Data

Feb. 12, 2014 (KR) ........................ 10-2014-0016095

(51) Int. Cl.
*F21V 9/04* (2018.01)
*G02B 5/20* (2006.01)
(Continued)

(52) U.S. Cl.
CPC ............. *G02B 5/208* (2013.01); *G02B 5/20* (2013.01); *G02B 5/223* (2013.01); *G03B 11/00* (2013.01); *H04N 5/374* (2013.01)

(58) Field of Classification Search
CPC ........ G02B 5/208; G02B 5/223; G02B 5/282; G02B 1/105; G02B 1/11; G02B 1/115;
(Continued)

(56) References Cited

U.S. PATENT DOCUMENTS

2004/0204555 A1* 10/2004 Noda ..................... C08F 220/18
526/242
2005/0084774 A1* 4/2005 Katsuragi ................ G03B 9/02
430/7

(Continued)

FOREIGN PATENT DOCUMENTS

CN 103323897 A 9/2013
JP 2008-102340 5/2008

(Continued)

OTHER PUBLICATIONS

International Search Report and the Written Opinion dated Jan. 16, 2015 From the Korean Intellectual Property Office Re. Application No. PCT/KR2014/010336 and Its Translation Into English.

(Continued)

*Primary Examiner* — William R Alexander
*Assistant Examiner* — Balram T Parbadia
(74) *Attorney, Agent, or Firm* — Polsinelli PC (57) ABSTRACT

An optical filter and an imaging device comprising the optical filter are provided. The optical filet comprises: a binder resin; a light absorption containing at least two kinds of light absorbents dispersed in the binder resin; and a near-infrared reflection layer. Further, the light absorbents comprise a first light absorbent having maximum absorption in a wavelength range of 680 to 700 nm and a second light absorbent having maximum absorption in a wavelength range of 700 to 750 nm, a wavelength at which the near-infrared reflection layer has a transmittance of 50% with regard to light incident in a direction perpendicular to the optical filter is in a range of 680 to 730 nm, and the optical filter satisfies [Equation 1] $\Delta E^* \le 1.5$, wherein $\Delta E^*$ represents a color difference between light, which has been incident in a direction perpendicular to the optical filter and has passed through the optical filter, and light, which has been incident (Continued)

at an angle of 30° with regard to the direction perpendicular to the optical filter and has passed through the optical filter.

13 Claims, 5 Drawing Sheets

(51) Int. Cl.
    *F21V 9/06*     (2018.01)
    *G03B 11/00*     (2006.01)
    *G02B 5/22*     (2006.01)
    *H04N 5/374*     (2011.01)

(58) Field of Classification Search
    CPC .... G02B 5/22; G02B 5/26; G02B 5/20; F21V 9/04; F21V 9/06
    See application file for complete search history.

(56) References Cited

U.S. PATENT DOCUMENTS

| | | | | |
|---|---|---|---|---|
| 2006/0154092 | A1* | 7/2006 | Naito | B32B 15/04 |
| | | | | 428/457 |
| 2006/0194020 | A1* | 8/2006 | Naito | H05K 9/0096 |
| | | | | 428/138 |
| 2006/0286381 | A1* | 12/2006 | Naito | G02B 1/11 |
| | | | | 428/411.1 |
| 2010/0025641 | A1* | 2/2010 | Jimbo | G02B 5/208 |
| | | | | 252/587 |
| 2010/0321770 | A1* | 12/2010 | Pyo | G02B 5/208 |
| | | | | 359/359 |
| 2014/0055652 | A1* | 2/2014 | Hasegawa | G02B 5/281 |
| | | | | 348/294 |
| 2014/0063597 | A1* | 3/2014 | Shimmo | G02B 5/208 |
| | | | | 359/359 |
| 2014/0264202 | A1* | 9/2014 | Nagaya | G02B 5/208 |
| | | | | 252/587 |
| 2014/0300956 | A1* | 10/2014 | Kubo | G02B 5/282 |
| | | | | 359/359 |
| 2016/0195651 | A1* | 7/2016 | Yoshioka | B32B 7/02 |
| | | | | 359/359 |

FOREIGN PATENT DOCUMENTS

| | | |
|---|---|---|
| JP | 2008-102340 A | 5/2008 |
| JP | 2008-304531 | 12/2008 |
| JP | 2008-304531 A | 12/2008 |
| KR | 10-2010-0137229 | 12/2010 |
| KR | 10-2012-0078435 | 7/2012 |
| KR | 10-2013-0108186 | 10/2013 |
| KR | 10-1362882 B1 | 2/2014 |
| WO | WO 2015/122595 | 8/2015 |

OTHER PUBLICATIONS

Office Action dated Dec. 21, 2017 in the corresponding Chinese Application No. 201480075266.0.

* cited by examiner

OPTICAL FILTER AND IMAGING DEVICE COMPRISING SAME

RELATED APPLICATIONS

This application is a National Phase of PCT Patent Application No. PCT/KR2014/010336 having International filing date of Oct. 31, 2014, which claims the benefit of priority of Korean Patent Application No. 10-2014-0016095 filed on Feb. 12, 2014. The contents of the above applications are all incorporated by reference as if fully set forth herein in their entirety.

FIELD AND BACKGROUND OF THE INVENTION

The present invention relates to an optical filter and an imaging device including the same.

Imaging devices such as cameras use a CMOS sensor to convert incident light into electronic signals, thereby forming images. To realize high-quality images with the high pixel counts of the cameras, newly developed back side illuminated-type (BSI-type) CMOS sensors have been applied to main cameras instead of front side illuminated-type (FSI-type) CMOS sensors widely used in the related art. The FSI-type CMOS sensors have an effect of blocking out some of light since wirings are formed on a top surface of a photodiode (PD). On the other hand, the BSI-type CMOS sensors may receive a larger amount of incident light, compared to the FSI-type CMOS sensors, since the wirings are disposed under the photodiode to receive a larger amount of light, and thus have an effect of increasing the intensity of an image by 70% or more. Therefore, the BSI-type CMOS sensors have generally been applied to most cameras with over eight million pixels.

Such BSI-type CMOS sensors have a structure in which light having a larger angle of incidence can also reach the photodiode, compared to those of the FSI-type CMOS sensors.

In general, the CMOS sensors may also detect light in a wavelength region which cannot be seen with the naked eye. Since an image is distorted by the light in such a wavelength region, colors different from those seen with the naked eye are observed. To solve this problem, an optical filter is used in the front of the CMOS sensors. However, the conventional optical filter has a problem in that the transmission spectrum of the optical filter varies as the angle of incidence of light varies, thereby resulting in distorted images.

SUMMARY OF THE INVENTION

Therefore, the present invention is directed to providing an optical filter capable of reducing a color difference caused due to an angle of incidence of light to enhance color reproduction characteristics.

Also, the present invention is directed to providing an imaging device including the optical filter.

To solve the above problem, one aspect of the present invention provides an optical filter which includes a light absorption layer including a binder resin and two or more light absorbents dispersed in the binder resin, and a near-infrared reflection layer. Here, the light absorbents may include a first light absorbent having maximum absorption in a wavelength range of 680 to 700 nm, and a second light absorbent having maximum absorption in a wavelength range of 700 to 750 nm, a wavelength at which the near-infrared reflection layer has a transmittance of 50% with regard to light incident in a direction perpendicular to the optical filter may be in a range of 680 to 730 nm, and the optical filter may satisfy the following Equation 1.

$$\Delta E^* \leq 1.5 \qquad \text{[Equation 1]}$$

In Equation 1, $\Delta E^*$ represents a color difference between light, which has been incident in a direction perpendicular to the optical filter and has passed through the optical filter, and light, which has been incident at an angle of 30° with regard to the direction perpendicular to the optical filter and has passed through the optical filter.

Another aspect of the present invention provides an imaging device including the optical filter according to one exemplary embodiment of the present invention.

Such an optical filter can be useful in preventing a shift in a transmission spectrum according to a change in the angle of incidence of light without hindering the transmittance in a visible region.

DESCRIPTION OF SPECIFIC EMBODIMENTS OF THE INVENTION

Hereinafter, in the present invention, the term "angle of incidence" refers to an angle of light incident on an optical filter with respect to a direction perpendicular to the optical filter. A required quantity of incident light may increase as the number of pixels of an imaging device increases. Therefore, the latest imaging devices need to receive light incident in a direction perpendicular to the optical filter as well as light incident at an angle of 30° or more with respect to the vertical direction.

Meanwhile, in the present invention, the term "$\Delta E^*$" refers to a color difference between light which has been incident in a direction perpendicular to the optical filter and has passed through the optical filter and light which has been incident at an angle of 30° with respect to the direction perpendicular to the optical filter and has passed through the optical filter.

In general, the light passing through the optical filter may be divided into a component substantially parallel with the incident light and a scattering component. In this case, a transmittance of the component of the light substantially parallel with the incident light is referred to as a direct transmittance, and a transmittance of the scattering component of the light is referred to as a diffuse transmittance. Generally, the transmittance of light is used as a concept encompassing the direct transmittance and the diffuse transmittance. However, in the present invention, the transmittance of light is used only to denote the direct transmittance.

Specifically, the $\Delta E^*$ is a concept used in a Commission International de l'Eclairage (CIE) Lab color space and is a color value specified by the CIE. Such a concept is cited in the present invention. The CIE Lab color space is a color coordinate space in which a difference in color that can be sensed by human eyesight may be expressed. A distance between two different colors in the CIE Lab color space is designed to be in proportion to the difference in color recognized by human beings.

The term "color difference" in the CIE Lab color space refers to a distance between two colors in the CIE Lab color space. That is, a longer distance means that there is a greater color difference, and a shorter distance means that there is a smaller color difference. Such a color difference may be indicated by $\Delta E^*$.

Any position in the CIE color space is represented by three coordinate values, that is, $L^*$, $a^*$ and $b^*$. The $L^*$ value represents a brightness. In this case, $L^*$ represents black when $L^*$ is 0 and represents white when $L^*$ is 100. The $a^*$ value represents a level of bias of a color having the corresponding color coordinates toward either pure magenta or pure green, and the $b^*$ value represents a level of bias of a color having the corresponding color coordinates toward either pure yellow or pure blue.

The range of $a^*$ spans from $-a$ to $+a$. The maximum value ($a^*$ max) of $a^*$ represents pure magenta, and the minimum value ($a^*$ min) of $a^*$ represents pure green. For example, $a^*$ represents a color closer to pure green when the $a^*$ value is negative, and represents a color closer to pure magenta when the $a^*$ value is positive. When $a^*=80$ is compared to $a^*=50$, $a^*=80$ represents a color closer to pure magenta, compared to $a^*=50$.

The range of $b^*$ spans from $-b$ to $+b$. The maximum value ($b^*$ max) of $b^*$ represents pure yellow, and the minimum value ($b^*$ min) of $b^*$ represents pure blue. For example, $b^*$ represents a color closer to pure yellow when the $b^*$ value is negative, and represents a color closer to pure blue when the $b^*$ value is positive. When $b^*=50$ is compared to $b^*=20$, $b^*=50$ represents a color closer to pure yellow, compared to $b^*=20$.

Typically, the color difference is hardly recognized by human eyesight when the $\Delta E^*$ is less than or equal to 1.5, and the color difference may not be recognized by human eyesight when the $\Delta E^*$ is less than or equal to 0.5. However, the color difference may be recognized by human eyesight when the $\Delta E^*$ is greater than 1.5, and the color difference may be clearly recognized by human eyesight when the $\Delta E^*$ is greater than or equal to 2.0. For example, when products are produced in a factory, maintaining the $\Delta E^*$ value in a range of 0.8 to 1.2 may mean that a deviation of color between the products is managed to an extent such that the deviation of color cannot be recognized by human eyesight.

The color difference $\Delta E^*$ between any color E1 having color coordinates of ($L1^*$, $a1^*$, $b1^*$) and another color E2 having color coordinates of ($L2^*$, $a2^*$, $b2^*$) may be calculated by the following Equation a.

$$\Delta E^* = \sqrt{(\Delta L^*)^2 + (\Delta a^*)^2 + (\Delta b^*)^2} \qquad \text{[Equation a]}$$

In Equation a, $\Delta L^*$ represents a difference between $L1^*$ and $L2^*$ of the color coordinates of the two colors E1 and E2. Also, the $\Delta a^*$ represents a difference between $a1^*$ and $a2^*$ of the color coordinates of E1 and E2, and the $\Delta b^*$ represents a difference between $b1^*$ and $b2^*$ of the color coordinates of E1 and E2.

In the present invention, the term "dynamic range of the visible region" refers to a range of light that can be actively expressed on a screen by a CMOS sensor. When light in an infrared region irrelevant to the color expression passes through the optical filter and is incident on the CMOS sensor, a dynamic range of the visible region required to realize colors is reduced. When the dynamic range of the visible region is reduced, it becomes impossible to distinguish an image in a dark region, making it difficult to realize an accurate image. Therefore, the optical filter has to have a minimized light transmittance in the infrared region. In the CMOS sensor, noise is generally generated by a circuit structure. Particularly, thermal noise is mainly caused by the circuit structure. Since the light of the infrared region that has passed through the optical filter acts as a leading cause of heat generation in the CMOS sensor, the optical filter has to have a minimized light transmittance in the infrared region.

The present invention is directed to providing an optical filter. By way of an example, the optical filter includes a light absorption layer including a binder resin and two or more light absorbents dispersed in the binder resin, and a near-infrared reflection layer. Here, the optical filter is characterized in that the light absorbents may include a first light absorbent having maximum absorption in a wavelength range of 680 to 700 nm, and a second light absorbent having maximum absorption in a wavelength range of 700 to 750 nm, a wavelength at which the near-infrared reflection layer has a transmittance of 50% with regard to light incident in a direction perpendicular to the optical filter may be in a range of 680 to 730 nm, and the optical filter may satisfy the following Equation 1.

$$\Delta E^* \leq 1.5 \qquad \text{[Equation 1]}$$

In Equation 1, $\Delta E^*$ represents a color difference between light, which has been incident in a direction perpendicular optical filter and has passed through the optical filter, and light, which has been incident at an angle of 30° with regard to the direction perpendicular to the optical filter and has passed through the optical filter.

The optical filter according to one exemplary embodiment of the present invention may include a light absorption layer including two or more light absorbents, and a near-infrared reflection layer. In this case, most of the light of a near-infrared region is reflected by the near-infrared reflection layer. However, as an angle of incidence of light increases, the transmission spectrum of the near-infrared reflection layer may vary when light is incident on the optical filter in a vertical direction (an angle of incidence of 0°) and when light is incident on the optical filter at a large angle of incidence. As a result, a color of an image may be distorted. Such distortion may be eliminated by forming a light absorption layer having maximum absorption in a wavelength region in which light is not reflected by the near-infrared reflection layer as the transmission spectrum of the near-infrared reflection layer varies. That is, a wavelength region in which the light cannot be reflected by the near-infrared reflection layer exists when the transmission spectrum of the near-infrared reflection layer is varied. In the present invention, a wavelength component which cannot be reflected by the near-infrared reflection layer may be prevented from being incident on the CMOS sensor using the light absorption layer having maximum absorption in a wavelength region in which the light cannot be reflected by the near-infrared reflection layer.

Types of the binder resin are not particularly limited as long as the light absorbent is easily dispersed. For example, at least one selected from the group consisting of a cyclic olefin-based resin, a polyarylate resin, a polysulfone resin, a polyether sulfone resin, a poly(para-phenylene) resin, a polyarylene ether phosphine oxide resin, a polyimide resin, a polyetherimide resin, a polyamide-imide resin, an acrylic resin, a polycarbonate resin, a polyethylene naphthalate resin, and various organic-inorganic hybrid resins may be used as the binder resin.

Specifically, the optical filter, which includes a light absorption layer including a binder resin and two or more light absorbents dispersed in the binder resin, and a near-infrared reflection layer, may control the maximum absorption wavelength of each of the light absorbents and characteristics of the near-infrared reflection layer. Therefore, even when an angle of incidence of light incident on the optical filter is changed, a distortion of an image caused accordingly may be prevented, and colors may be reproduced with the same accuracy as in an image observed with the naked eye.

This may be confirmed by Equation 1.

In Equation 1, $\Delta E^*$ represents a color difference calculated by applying to Equation a the color coordinates (L1*, a1*, b1*) of light E1 which has been incident in a direction perpendicular to the optical filter according to one exemplary embodiment of the present invention and has passed through the optical filter and the color coordinates (L2*, a2*, b2*) of light E2 which has been incident at an angle of 30° with respect to the direction perpendicular to the optical filter and has passed through the optical filter.

As described above, when the optical filter is realized such that a color difference ($\Delta E^*$) is less than or equal to 1.5, a distortion of colors present in an image expressed on a display device becomes unrecognizable by human eyesight.

For example, the $\Delta E^*$ value may be in a range of 0.001 to 1.5, 0.001 to 1.2, 0.001 to 1.0, or 0.001 to 0.8.

According to another exemplary embodiment, the optical filter may satisfy the following Equation 2.

$$\Delta a^* \leq 1.0 \qquad \text{[Equation 2]}$$

In Equation 2, $\Delta a^*$ represents an absolute value of a difference between a coordinate a* of light which has been incident in a direction perpendicular to the optical filter and has passed through the optical filter, and a coordinate a* of light, which has been incident at an angle of 30° with regard to the direction perpendicular to the optical filter and has passed through the optical filter, in the color coordinates represented by (L*, a*, b*) in a CIE Lab color space.

When $\Delta E^*$ represents a color difference in the entire visible region, $\Delta a^*$ is adequate to check the color difference of red-based light, that is, light corresponding to a wavelength range of 600 to 800 nm. The performance of the optical filter as described in the present invention may be very sensitively affected by the color difference in an infrared wavelength region, that is, a wavelength range of 600 to 800 nm. Therefore, the $\Delta a^*$ which is most affected by a color of an infrared region among the colors may be controlled to be less than or equal to 1.0 to reduce a distortion of an image.

According to another exemplary embodiment, the optical filter may satisfy the following Equation 3.

$$\% T_{peak} - \% T_{valley} \leq 1\% \qquad \text{[Equation 3]}$$

In Equation 3, % $T_{peak}$ represents a maximum transmittance observed in a wavelength range between a maximum absorption wavelength of the first light absorbent and a maximum absorption wavelength of the second light absorbent, and % $T_{valley}$ represents a higher one of the transmittance of the first light absorbent at the maximum absorption wavelength and the transmittance of the second light absorbent at the maximum absorption wavelength.

When two or more light absorbents having different maximum absorptions are mixed to form a light absorption layer, some of a wavelength region in which an absorption capacity between the maximum absorptions of the respective light absorbents is degraded due to the different maximum absorptions of the light absorbents may exist. That is, when two light absorbents are mixed to be used, an absorption wavelength region of light may be widened, but a problem where light in some of the wavelength region between the maximum absorption wavelengths passes through the light absorbents may be caused.

However, the optical filter according to one exemplary embodiment of the present invention may control the % $T_{peak}$-% $T_{valley}$ value to be less than or equal to 1% to sharply reduce the light transmittance in a wavelength range of the near-infrared region and simultaneously minimize transmission of light that may be caused in the wavelength range of the near-infrared region, thereby reducing a distortion of an image.

For example, the % $T_{peak}$-% $T_{valley}$ value may be in a range of 0.001 to 1%, 0.001 to 0.8%, 0.001 to 0.5%, or 0.001 to 0.2%.

According to another exemplary embodiment, the optical filter may satisfy the following Equation 4.

$$|P1-P2| \leq 60 \text{ nm} \qquad \text{[Equation 4]}$$

In Equation 4, P1 represents a maximum absorption wavelength of the first light absorbent, and P2 represents a maximum absorption wavelength of the second light absorbent.

Specifically, referring to Equation 4, an absolute value of a difference between a wavelength at which the first light absorbent has the maximum absorption and a wavelength at which the second light absorbent has the maximum absorption may be less than or equal to 60 nm. For example, the absolute value of the difference between the respective maximum absorption wavelengths may be in a range of 1 nm to 60 nm, 5 nm to 60 nm, 5 nm to 50 nm, or 10 nm to 35 nm. When two light absorbents having a difference value within this range are used, a light absorption wavelength region in a wavelength range of the near-infrared region may be widened, thereby reducing a distortion of an image due to a high near-infrared blocking effect of the optical filter.

A weight ratio of the first light absorbent and the second light absorbent included in the light absorption layer may be in a range of 1:0.2 to 1:1. For example, the weight ratio may be in a range of 1:0.2 to 1:0.4, 1:0.3 to 1:0.5, or 1:0.3 to 1:0.4. When the first light absorbent and the second light absorbent are included at a weight ratio within this range, the requirements of one or more of Equations 1 to 4 may be more effectively satisfied.

Two or more selected from the group consisting of various types of dyes, pigments or metal complex compounds may be used as the light absorbents, but the present invention is not particularly limited thereto. For example, a cyanine-based compound, a phthalocyanine-based compound, a naphthalocyanine-based compound, or a dithiol metal complex compound may be used as the light absorbents.

The light absorption layer may be formed of a single layer, and may include two or more light absorbents. In this case, a first light absorbent and a second light absorbent may be mixed so that the above-described weight ratio is satisfied, and then used. Meanwhile, the light absorption layer may be formed of two or more layers, and each of the layers may include one light absorbent. For example, the light absorption layer may be formed of two layers, and configured so that a first light absorption layer includes a first light absorbent and a second light absorption layer includes a second light absorbent.

The light absorbent may include two light absorbents selected from the same type of light absorbents. For example, two light absorbents selected from one type of a cyanine-based compound, a phthalocyanine-based compound, a naphthalocyanine-based compound, or a dithiol metal complex compound may be used. When two light absorbents belonging to the same type are used, the two light absorbents may have maximum absorption at similar wavelengths, thereby realizing an absorption peak having a desired range of wavelengths. Also, when the two light absorbents belonging to the same type of light absorbents are used, the requirements of one or more of Equations 1 to 4 may be more effectively satisfied. For example, two light absorbents selected from cyanine-based compounds having similar maximum absorption may be used as the light absorbents.

The content of the light absorbent included in the optical filter may, for example, be in a range of 0.001 to 10 parts by weight, 0.01 to 10 parts by weight, or 0.5 to 5 parts by weight, based on 100 parts by weight of the binder resin. When the content of the light absorbent is controlled within this range, a shift in transmission spectrum of the near-infrared reflection layer due to an angle of incidence may be corrected, and a superior near-infrared blocking effect may be achieved. Also, when the light absorbent is used in a combination of two or more, an absorption wavelength range (full width at half maximum (FWHM)) of the light absorption layer may increase, thereby minimizing the transmission of light in a wavelength range of the near-infrared region.

According to another exemplary embodiment, the optical filter may satisfy the following Equation 5.

$$\% \ T_{NIR\text{-}peak} \leq 10\% \quad \text{[Equation 5]}$$

In Equation 5, % $T_{NIR\text{-}peak}$ represents a maximum transmittance in a wavelength range of 700 to 750 nm.

Specifically, Equation 5 is used to determine that the transmission of light in the wavelength range of the near-infrared region may be minimized when two or more light absorbents are used. In this case, the % $T_{NIR\text{-}peak}$ represents a maximum transmittance in the wavelength range of the near-infrared region. Here, the % $T_{NIR\text{-}peak}$ may be less than or equal to 10%. For example, the % $T_{NIR\text{-}peak}$ may be in a range of 0.1% to 8%, 1% to 5%, or 1% to 2%, and preferably 0%. Distortion of an image may be effectively reduced as the % $T_{NIR\text{-}peak}$ reaches 0%.

According to another exemplary embodiment, in the optical filter, an absolute value ($\Delta T_{30\%}$) of a difference between a wavelength at which the transmittance of light incident in a vertical direction is 30% in a wavelength range of 600 to 750 nm and a wavelength at which the transmittance of light incident at an angle of 30° with respect to the vertical direction is 30% may be less than or equal to 15 nm.

This may mean the transmittance of the light in a wavelength range of 600 to 750 nm by the optical filter. Specifically, this may mean that the absolute value of the difference between wavelengths at which the transmittance of light incident on the optical filter in a vertical direction and the transmittance of light incident at an angle of 30° with respect to the vertical direction are 30% is less than or equal to 15 nm. For example, the absolute value of the difference between the wavelengths may be in a range of 1 nm to 15 nm, 1 nm to 8 nm, or 1 nm to 5 nm. In this way, even though an angle of incidence of light incident on the optical filter through a lens of a solid imaging device, etc. may be changed, distortion of an image thereby caused may be prevented, and colors may be reproduced at the same accuracy as in an image observed with the naked eye.

According to another exemplary embodiment, the optical filter of the present invention may have an average transmittance of 80% or more with respect to the light in a visible region (450 to 600 nm).

When the optical filter is applied to an imaging device or a camera module, the optical filter may have a high light transmittance in the visible region. When the optical filter has an average transmittance of 80% or more in the visible region, images expressed by the imaging device or the camera module to which the optical filter is applied may be represented at the same color accuracy as in images observed with the naked eye.

According to still another exemplary embodiment, the optical filter of the present invention may have an average transmittance of 10% or less with respect to the light in an infrared region (750 to 1,000 nm).

Specifically, the above-described condition may mean that the transmittance of the light of the infrared region by the optical filter is less than or equal to 10%. When the transmittance of the light of the infrared region by the optical filter is controlled within this range, a decrease in the dynamic range of the visible region, an increase in noise, and decreases in color reproduction characteristics and resolution may be prevented.

As a high-pixel-density imaging device using a sensor having a high sensitivity such as the BSI-type CMOS sensor is developed, when an angle of incidence of light incident on the optical filter applied to the imaging device varies, a shift in a transmission spectrum of the optical filter was caused, and images provided by the high-pixel-density imaging device is severely distorted accordingly. To prevent such a severe distortion, an alternative to controlling the difference in wavelengths at which the transmittance of light which has been incident in a direction perpendicular to the optical filter and has passed through the optical filter and light which has been incident at an angle of 30° with respect to the direction perpendicular to the optical filter and has passed through the optical filter is 50% was introduced in the prior art. However, there was a limit to preventing the distortion of images only by controlling the difference in the wavelengths at which the transmittance of light incident in each of the angles is 50%. That is, the transmittance of the optical filter drastically varies at a wavelength at which the transmittance of light incident in each of the angles is 30% when the angle of incidence of the light varies. As a result, the images remained distorted.

To solve the problems of the prior art as described above, in the optical filter according to one exemplary embodiment of the present invention, the wavelength at which the transmittance of light incident at the each of the angles of incidence is 50% and the wavelength at which the transmittance of light incident at each of the angles of incidence is 30% were controlled at the same time, as described in Equations 1 to 5. As a result, when the difference in the wavelengths at which the transmittance of the light which has been incident in the direction perpendicular to the optical filter and has passed through the optical filter and the light which has been incident at an angle of 30° with respect to the direction perpendicular to the optical filter and has passed through the optical filter is 30% is controlled to 15 nm or less, the optical filter according to one exemplary embodiment of the present invention was able to further reduce the distortion of images, compared to the conventional optical filters.

The optical filter according to one exemplary embodiment of the present invention may further include a transparent base formed on one surface of the light absorption layer. For example, the transparent base may be a transparent glass substrate or a transparent resin-based substrate.

Specifically, a transparent glass substrate may be used as the transparent base, and a phosphate-based glass substrate containing copper oxide (CuO) may be used when necessary. When the glass substrate is used as the transparent base, thermal deformation may be prevented and bending may be suppressed during manufacturing of the optical filter without decreasing the transmittance of visible light.

The transparent resin-based substrate may have an excellent strength. For example, a light-transmitting resin in which an inorganic filler is dispersed may be used. The type of the light-transmitting resin is not particularly limited, and the binder resin said to be applicable to the light absorption layer may be used. For example, the type of the binder resin used in the light absorption layer and the type of the resin used in the transparent base may be controlled in the same or a similar manner to reduce the occurrence of interfacial delamination.

The near-infrared reflection layer may be formed as a multilayer dielectric film. The near-infrared reflection layer serves to reflect light of a near-infrared region. For example, a multilayer dielectric film in which a high refractive index layer and a low refractive index layer are alternately stacked may be used as the near-infrared reflection layer. When necessary, the near-infrared reflection layer may further include an aluminum-deposited film, a noble metal thin film, or a resin film in which fine particles of either indium oxide or tin oxide are dispersed.

By way of an example, the near-infrared reflection layer may have a structure in which a dielectric layer having a first refractive index and a dielectric layer having a second refractive index are alternately stacked. A difference in refractive index between the dielectric layer having a first refractive index and the dielectric layer having a second refractive index may be greater than or equal to 0.2, or 0.3, or in a range of 0.2 to 1.0.

For example, the dielectric layer having a first refractive index may be a layer having a relatively high refractive index, and the dielectric layer having a second refractive index may be a layer having a relatively low refractive index. In this case, the refractive index of the dielectric layer having a first refractive index may be in a range of 1.6 to 2.4, and the refractive index of the dielectric layer having a second refractive index may be in a range of 1.3 to 1.6.

The dielectric layer having a first refractive index may be formed of at least one selected from the group consisting of titanium oxide, alumina, zirconium oxide, tantalum pentoxide, niobium pentoxide, lanthanum oxide, yttrium oxide, zinc oxide, zinc sulfide, and indium oxide. The indium oxide may further include a small amount of titanium oxide, tin oxide, or cerium oxide, when necessary.

The dielectric layer having a second refractive index may be formed of at least one selected from the group consisting of silica, lanthanum fluoride, magnesium fluoride, and sodium fluoride alumina.

A method of forming the near-infrared reflection layer is not particularly limited, and the near-infrared reflection layer may, for example, be formed using a method such as CVD, sputtering, vacuum deposition, etc.

The near-infrared reflection layer may have a structure in which the dielectric layer having a first refractive index and the dielectric layer having a second refractive index are alternately stacked 5 to 61 times, 11 to 51 times, or 21 to 41 times. The near-infrared reflection layer may be designed in consideration of a desired range of transmittance and refractive index, a region of wavelengths to be blocked, etc.

The near-infrared reflection layer may further include a light absorbent dispersed in the multilayer dielectric film. For example, the light absorbent dispersed in the multilayer dielectric film may be used without any particular limitation as long as the light absorbent can absorb light in a near-infrared (≥600 nm) to infrared wavelength region. The light absorbent may be dispersed in the multilayer dielectric film to reduce the number of alternately stacked layers in the multilayer dielectric film, thereby reducing a thickness of the near-infrared reflection layer. In this way, when the near-infrared reflection layer is applied to the imaging device, the imaging device may be made smaller.

The present invention may provide an imaging device including the optical filter according to one exemplary embodiment of the present invention. The optical filter according to one exemplary embodiment of the present invention is also applicable to display devices including a PDP, etc. However, the optical filter is more preferably applicable to recent imaging devices requiring a high pixel density, for example, cameras with over eight million pixels, etc. For example, the optical filter according to one exemplary embodiment of the present invention is effectively applicable to cameras for mobile devices.

EXAMPLES

Hereinafter, the optical filter having a novel structure according to one exemplary embodiment of the present invention will be described in further detail with reference to specific embodiments of the present invention. However, it should be understood that the description proposed herein is just a preferred example for the purpose of illustration only and is not intended to limit or define the scope of the invention.

Preparative Example 1

TiO$_2$ and SiO$_2$ were alternately deposited on one surface of a glass substrate using an E-beam evaporator to form a near-infrared reflection layer.

Separately, a light absorbent, in which commercially available first and second light absorbents having maximum absorptions of 685 nm and 702 nm, respectively, were mixed at a weight ratio of 1:0.1, a cyclic olefin-based resin as a binder resin source, and toluene (commercially available from Sigma Aldrich) were mixed, and stirred for at least a day using a magnetic stirrer to prepare a solution for near-infrared absorption.

Next, the prepared solution for near-infrared absorption was spin-coated on the surface of the glass substrate opposite to the surface on which near-infrared reflection layer was formed to form a light absorption layer.

Figure 1:
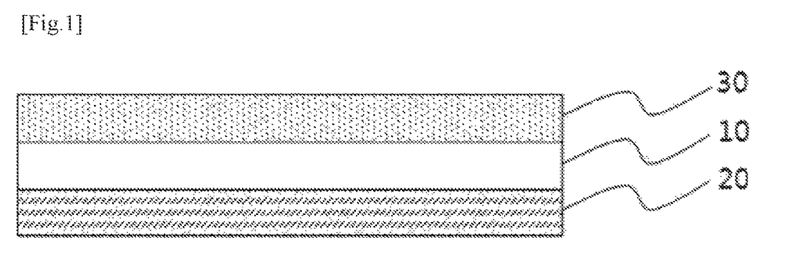
FIG. 1 is a cross-sectional view showing a stacked structure of an optical filter according to one exemplary embodiment of the present invention.

The optical filter according to one exemplary embodiment of the present invention was manufactured using the above-described method. A stacked structure of the manufactured optical filter is shown in FIG. 1. Referring to FIG. 1, a near-infrared reflection layer 20 is formed on the bottom surface of a glass substrate 10, and a light absorption layer 30 is formed on the top surface of the glass substrate 10.

Figure 2:
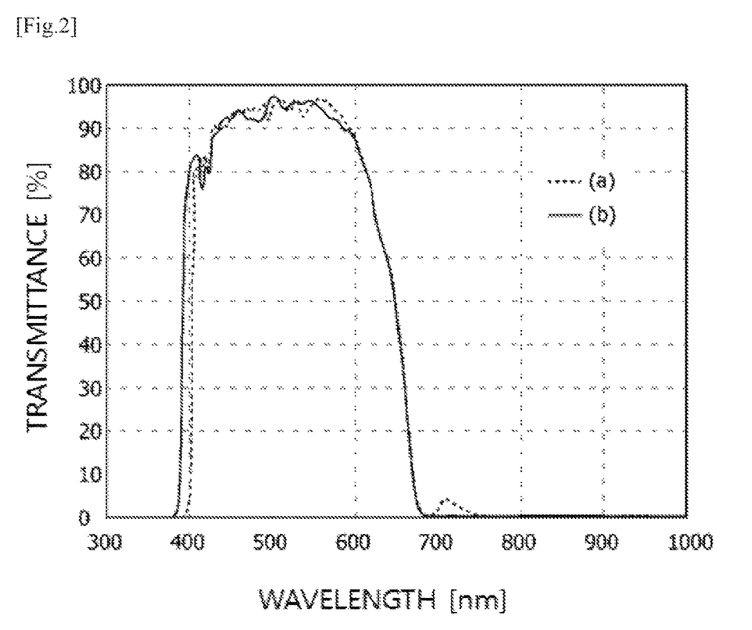
FIGS. 2, 3, 4 and 5 are graphs illustrating the light transmittance spectra of the optical filter according to one exemplary embodiment of the present invention, respectively.

A light transmittance test was carried out on the optical filter manufactured in this Preparative Example 1 at different angles ((a) 0° and (b) 30°) of incidence of light. The results are shown in FIG. 2.

Preparative Example 2

An optical filter was manufactured in the same manner as in Preparative Example 1, except that a first light absorbent and a second light absorbent were mixed at a weight ratio of 1:0.3 and the resulting mixture was used as the light absorbent included in the light absorption layer.

Figure 3:
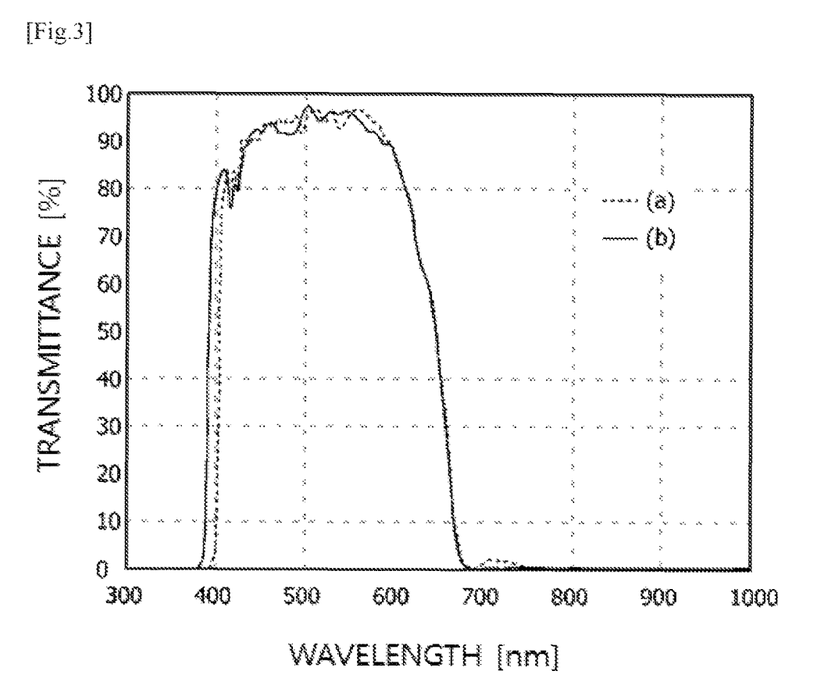

A light transmittance test was carried out on the optical filter manufactured in this Preparative Example 2 at different angles of incidence of light of (a) 0° and (b) 30°. The results are shown in FIG. 3.

Preparative Example 3

An optical filter was manufactured in the same manner as in Preparative Example 1, except that a first light absorbent and a second light absorbent were mixed at a weight ratio of 1:0.6 and the resulting mixture was used as the light absorbent included in the light absorption layer.

Figure 4:
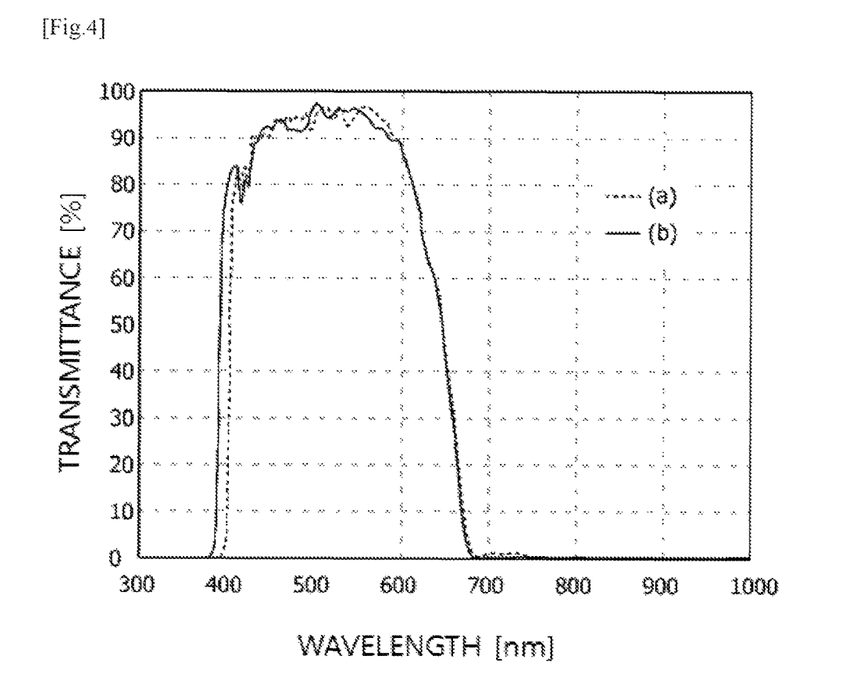

A light transmittance test was carried out on the optical filter manufactured in this Preparative Example 3 at different angles of incidence of light of (a) 0° and (b) 30°. The results are shown in FIG. 4.

Preparative Example 4

An optical filter was manufactured in the same manner as in Preparative Example 1, except that a first light absorbent and a second light absorbent were mixed at a weight ratio of 1:1 and the resulting mixture was used as the light absorbent included in the light absorption layer.

Figure 5:
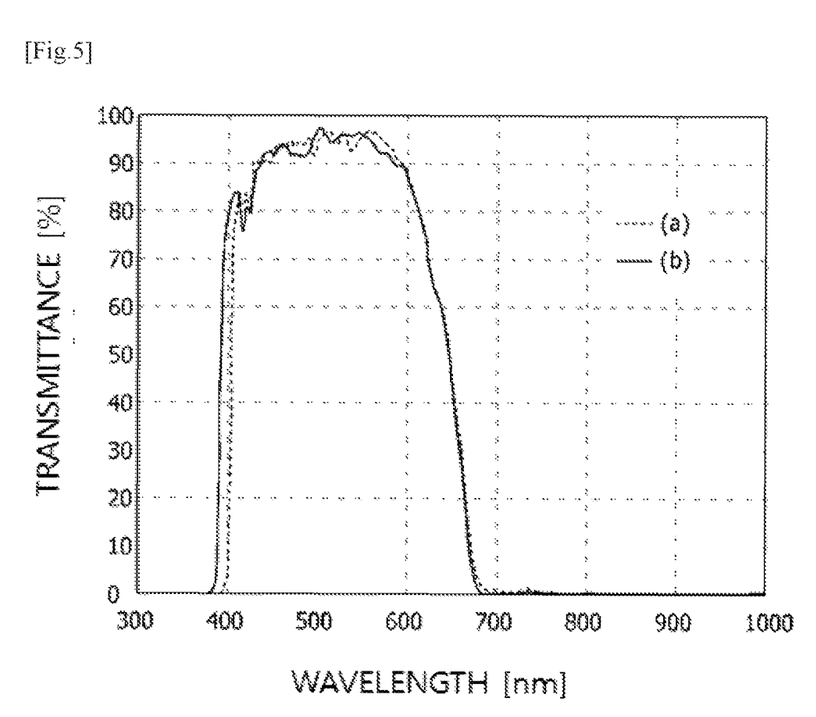

A light transmittance test was carried out on the optical filter manufactured in this Preparative Example 4 at different angles of incidence of light of (a) 0° and (b) 30°. The results are shown in FIG. 5.

Preparative Examples 5-1 to 5-12

Optical filters were manufactured in the same manner as in Preparative Example 1, except that the light absorption layer was formed to include two layers including first and second absorption layers in which the commercially available first and second light absorbents having maximum absorptions of 700 nm and 730 nm, respectively, were used. In this case, the first light absorption layer was formed to have a thickness of 15 μm, and the second light absorption layer was manufactured to have a different thickness of 1 to 12 μm.

Comparative Example 1

An optical filter was manufactured in the same manner as in Preparative Example 1, except that the light absorption layer was formed to include only one light absorbent which was commercially available and had a maximum absorption of 685 nm.

Figure 6:
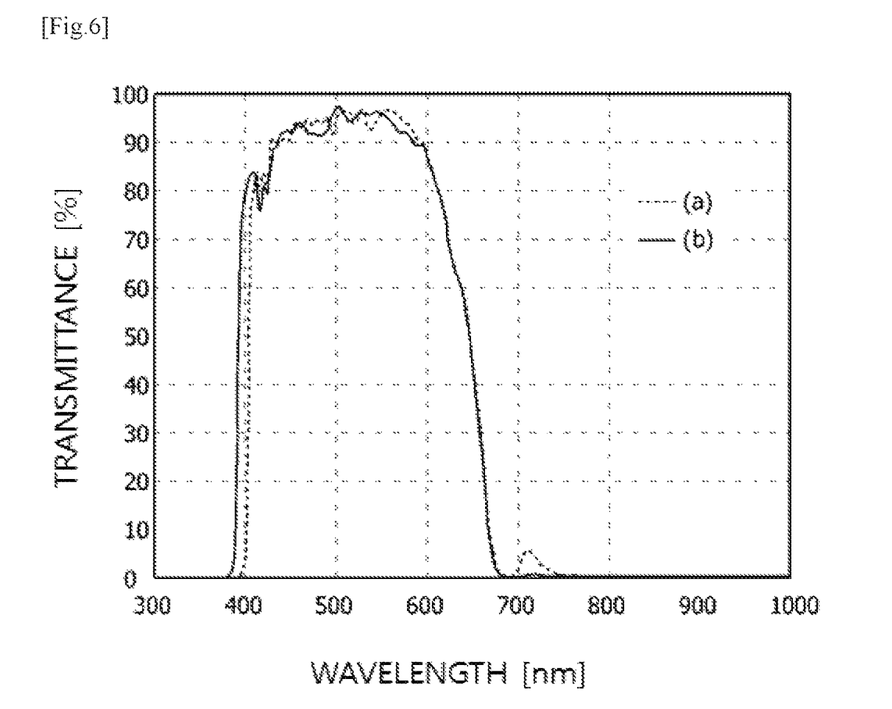
FIG. 6 is a graph illustrating the light transmittance spectra of an optical filter according to Comparative Example 1.

A light transmittance test was carried out on the optical filter manufactured in this Comparative Example 1 at different angles of incidence of light of (a) 0° and (b) 30°. The results are shown in FIG. 6.

Experimental Example 1

% $T_{NIR\text{-}peak}$ values of the optical filters of Preparative Examples 1 to 4 and Comparative Example 1 in a wavelength range of 700 to 750 nm were measured. The results are listed in the following Table 1.

TABLE 1

| No. | %$T_{NIR\text{-}peak}$ (%) |
| --- | --- |
| Preparative Example 1 | 3.8 |
| Preparative Example 2 | 2 |
| Preparative Example 3 | 1.2 |
| Preparative Example 4 | 0.5 |
| Comparative Example 1 | 5.5 |

As listed in Table 1, it could be seen that the % $T_{NIR\text{-}peak}$ values measured in a wavelength range of 700 to 750 nm was able to be controlled to be less than or equal to 5% in the optical filters according to the exemplary embodiments of the present invention.

Experimental Example 2

ΔE* values of the optical filters manufactured in Preparative Examples 5-1 to 5-12 were measured.

Specifically, the color coordinates L*, a* and b* of the light passing through each of the optical filters when white light was irradiated on the manufactured optical filter in a vertical direction (an angle of incidence of 0°) and irradiated on the optical filter at an angle of 30° with respect to the vertical direction were measured using a Lambda 35 spectrophotometer commercially available from Perkin Elmer, and the ΔE* values were then calculated from the color coordinates L*, a* and b*.

In this case, the wavelength W1 at which the near-infrared reflection layer had a transmittance of 50% was controlled to be in a range of 670 nm to 750 nm by varying the number of alternately stacked layers of $TiO_2$ and $SiO_2$ used to form the near-infrared reflection layer. The results are listed in the following Table 2.

TABLE 2

| | W1 (nm) | | | | | | | |
| --- | --- | --- | --- | --- | --- | --- | --- | --- |
| | 670 | 680 | 690 | 700 | 710 | 720 | 730 | 740 | 750 |
| Preparative Example 5-1 | 2.4 | 1.1 | 0.5 | 0.6 | 0.8 | 1.1 | 1.6 | 2.4 | 3.7 |
| Preparative Example 5-2 | 2.4 | 1.2 | 0.6 | 0.6 | 0.8 | 1.1 | 1.5 | 2.4 | 3.6 |
| Preparative Example 5-3 | 2.5 | 1.2 | 0.6 | 0.5 | 0.7 | 1.0 | 1.5 | 2.3 | 3.6 |
| Preparative Example 5-4 | 2.5 | 1.3 | 0.6 | 0.5 | 0.7 | 1.0 | 1.4 | 2.3 | 3.5 |

TABLE 2-continued

| | W1 (nm) | | | | | | | | |
|---|---|---|---|---|---|---|---|---|---|
| | 670 | 680 | 690 | 700 | 710 | 720 | 730 | 740 | 750 |
| Preparative Example 5-5 | 2.6 | 1.4 | 0.7 | 0.5 | 0.7 | 0.9 | 1.4 | 2.2 | 3.5 |
| Preparative Example 5-6 | 2.6 | 1.4 | 0.7 | 0.5 | 0.6 | 0.9 | 1.3 | 2.2 | 3.4 |
| Preparative Example 5-7 | 2.7 | 1.5 | 0.8 | 0.5 | 0.6 | 0.9 | 1.3 | 2.1 | 3.4 |
| Preparative Example 5-8 | 2.7 | 1.5 | 0.8 | 0.6 | 0.6 | 0.8 | 1.3 | 2.1 | 3.3 |
| Preparative Example 5-9 | 2.8 | 1.6 | 0.9 | 0.6 | 0.6 | 0.8 | 1.2 | 2.0 | 3.3 |
| Preparative Example 5-10 | 2.8 | 1.7 | 1.0 | 0.7 | 0.6 | 0.8 | 1.2 | 2.0 | 3.3 |
| Preparative Example 5-11 | 2.9 | 1.7 | 1.0 | 0.7 | 0.6 | 0.8 | 1.2 | 2.0 | 3.2 |
| Preparative Example 5-12 | 2.9 | 1.8 | 1.1 | 0.8 | 0.7 | 0.8 | 1.2 | 2.0 | 3.2 |

As listed in Table 2, it could be seen that the color difference ΔE* between the light which had been incident in a direction perpendicular to the optical filter and had passed through the optical filter and the light which had been incident on the optical filter at an angle of incidence of 30° and had passed through the optical filter was less than or equal to 1.5 in the optical filters according to the exemplary embodiments of the present invention when the wavelength W1 at which the near-infrared reflection layer had a transmittance of 50% was in a range of 690 to 720 nm.

Experimental Example 3

The % $T_{peak}$ and % $T_{valley}$ values of the optical filters of Preparative Examples 5-10 to 5-12 in which the second light absorption layer was formed to have a thickness of 10, 11 and 12 μm were measured to calculate the % $T_{peak}$–% $T_{valley}$ values as shown in Equation 3. Specifically, the % $T_{peak}$ and % $T_{valley}$ values of the manufactured optical filters were measured when white light was irradiated on the optical filters in a vertical direction (an angle of incidence of 0°) and irradiated at an angle of 30° with respect to the vertical direction. The results are listed in the following Table 3.

TABLE 3

| | | Preparative Example 5-10 | Preparative Example 5-11 | Preparative Example 5-12 |
|---|---|---|---|---|
| %$T_{peak}$-%$T_{valley}$ | 0° | 0.011 | 0.022 | 0.026 |
| | 30° | 0.008 | 0.016 | 0.019 |

As listed in Table 3, it could be seen that the % $T_{peak}$–% $T_{valley}$ values were controlled to be less than or equal to 1% in the optical filters according to the exemplary embodiments of the present invention both when white light was irradiated on the optical filters in a vertical direction (an angle of incidence of 0°) and irradiated at an angle of 30° with respect to the vertical direction.

Experimental Example 4

The % $T_{NIR-peak}$ values (units: %) of the optical filters manufactured in Preparative Examples 5-1 to 5-12 and Comparative Example 1 were measured.

In this case, the wavelength W1 at which the near-infrared reflection layer had a transmittance of 50% was controlled to be in a range of 670 nm to 750 nm by varying the number of alternately stacked layers of $TiO_2$ and $SiO_2$ used to form the near-infrared reflection layer. The results are listed in the following Table 4.

TABLE 4

| | W1 (nm) | | | | | | | | |
|---|---|---|---|---|---|---|---|---|---|
| | 670 | 680 | 690 | 700 | 710 | 720 | 730 | 740 | 750 |
| Preparative Example 5-1 | 0.4 | 0.5 | 0.5 | 0.7 | 1.4 | 6.0 | 18.9 | 38.5 | 59.5 |
| Preparative Example 5-2 | 0.4 | 0.5 | 0.5 | 0.5 | 0.8 | 3.8 | 11.2 | 24.3 | 46.5 |
| Preparative Example 5-3 | 0.3 | 0.5 | 0.5 | 0.5 | 0.7 | 2.4 | 6.7 | 16.0 | 37.7 |
| Preparative Example 5-4 | 0.3 | 0.4 | 0.5 | 0.5 | 0.6 | 1.6 | 4.1 | 11.0 | 31.3 |
| Preparative Example 5-5 | 0.3 | 0.4 | 0.5 | 0.5 | 0.5 | 1.1 | 2.5 | 8.2 | 26.4 |
| Preparative Example 5-6 | 0.2 | 0.4 | 0.5 | 0.5 | 0.5 | 1.0 | 1.8 | 6.4 | 22.8 |
| Preparative Example 5-7 | 0.2 | 0.4 | 0.5 | 0.5 | 0.5 | 0.9 | 1.7 | 5.3 | 19.8 |
| Preparative Example 5-8 | 0.2 | 0.4 | 0.5 | 0.5 | 0.5 | 0.8 | 1.6 | 4.6 | 17.5 |
| Preparative Example 5-9 | 0.2 | 0.4 | 0.5 | 0.5 | 0.5 | 0.8 | 1.5 | 4.0 | 15.6 |

TABLE 4-continued

| | W1 (nm) | | | | | | | | |
|---|---|---|---|---|---|---|---|---|---|
| | 670 | 680 | 690 | 700 | 710 | 720 | 730 | 740 | 750 |
| Preparative Example 5-10 | 0.2 | 0.3 | 0.5 | 0.5 | 0.5 | 0.8 | 1.4 | 3.6 | 14.0 |
| Preparative Example 5-11 | 0.2 | 0.3 | 0.5 | 0.5 | 0.5 | 0.7 | 1.3 | 3.3 | 12.7 |
| Preparative Example 5-12 | 0.2 | 0.3 | 0.5 | 0.5 | 0.5 | 0.7 | 1.3 | 3.1 | 11.6 |
| Comparative Example 1 | 0.5 | 0.5 | 0.6 | 1.1 | 2.3 | 9.5 | 31.6 | 62.7 | 80.3 |

As listed in Table 4, it could be seen that the % $T_{NIR\text{-}peak}$ values were less than or equal to 10% in the optical filters according to the exemplary embodiments of the present invention when the wavelength W1 at which the near-infrared reflection layer had a transmittance of 50% was in a range of 670 nm to 720 nm, and that the % $T_{NIR\text{-}peak}$ values were less than or equal to 10% in the optical filters manufactured in Preparative Examples 5-5 to 5-12 even when the W1 was in a range of 670 to 740 nm.

INDUSTRIAL APPLICABILITY

The optical filter according to one exemplary embodiment of the present invention may be used for imaging devices.

What is claimed is:

1. An optical filter comprising:
   a light absorption layer including a binder resin and two or more light absorbents dispersed in the binder resin;
   a transparent base having a first surface attached to the light absorption layer; and
   a near-infrared reflection layer attached to a second surface of the transparent base,
   wherein the light absorbents comprise a first light absorbent having a first maximum absorption in a wavelength range of 680 to 700 nm and a second light absorbent having a second maximum absorption in a wavelength range of greater than 700 to 750 nm, and the first and second maximum absorptions do not overlap each other,
   a wavelength at which the near-infrared reflection layer has a transmittance of 50% with regard to light incident in a direction perpendicular to the optical filter is in a range of 680 to 730 nm, and
   the optical filter satisfies the following Equation 1:

$$\Delta E^* \leq 1.5 \qquad [\text{Equation 1}]$$

wherein $\Delta E^*$ represents a color difference between light, which has been incident in a direction perpendicular to the optical filter and has passed through the optical filter, and light, which has been incident at an angle of 30° with regard to the direction perpendicular to the optical filter and has passed through the optical filter.

2. The optical filter of claim 1, which satisfies the following Equation 2:

$$\Delta a^* \leq 1.0 \qquad [\text{Equation 2}]$$

wherein $\Delta a^*$ represents an absolute value of a difference between a coordinate a* of light which has been incident in a direction perpendicular to the optical filter and has passed through the optical filter, and a coordinate a* of light, which has been incident at an angle of 30° with regard to the direction perpendicular to the optical filter and has passed through the optical filter, in the color coordinates represented by (L*, a*, b*) in a CIE Lab color space.

3. The optical filter of claim 1, which satisfies the following Equation 3:

$$\% T_{peak} - \% T_{valley} \leq 1\% \qquad [\text{Equation 3}]$$

wherein % $T_{peak}$ represents a maximum transmittance observed in a wavelength range between a maximum absorption wavelength of the first light absorbent and a maximum absorption wavelength of the second light absorbent, and
   % $T_{valley}$ represents a higher one of the transmittance of the first light absorbent at the maximum absorption wavelength and the transmittance of the second light absorbent at the maximum absorption wavelength.

4. The optical filter of claim 1, which satisfies the following Equation 4:

$$|P1 - P2| \leq 60 \text{ nm} \qquad [\text{Equation 4}]$$

wherein P1 represents a maximum absorption wavelength of the first light absorbent, and P2 represents a maximum absorption wavelength of the second light absorbent.

5. The optical filter of claim 1, wherein a weight ratio of the first light absorbent and the second light absorbent included in the light absorption layer is in a range of 1:0.2 to 1:1.

6. The optical filter of claim 1, wherein the light absorbent comprises one or more selected from the group consisting of a cyanine-based absorbent, a phthalocyanine-based absorbent, and a dithiol-based absorbent.

7. The optical filter of claim 6, wherein the light absorbent comprises two light absorbents selected from the same type of light absorbents.

8. The optical filter of claim 1, which satisfies the following Equation 5:

$$\% T_{NIR\text{-}peak} < 10\% \qquad [\text{Equation 5}]$$

wherein % $T_{NIR\text{-}peak}$ represents a maximum transmittance in a wavelength range of 700 to 750 nm.

9. The optical filter of claim 1, wherein an absolute value ($\Delta T_{30}\%$) of a difference between a wavelength at which the transmittance of light incident in a vertical direction is 30% in a wavelength range of 600 to 750 nm and a wavelength at which the transmittance of light incident at an angle of 30° with respect to the vertical direction is 30% is less than or equal to 15 nm.

10. The optical filter of claim 1, wherein the transparent base includes a glass substrate.

11. The optical filter of claim 1, wherein the near-infrared reflection layer is formed of multilayer dielectric films.

12. The optical filter of claim 11, wherein the near-infrared reflection layer further comprises a light absorbent dispersed in the multilayer dielectric films.

13. An imaging device comprising the optical filter defined in claim 1.

* * * * *